US012682895B1

(12) United States Patent
Negoita et al.

(10) Patent No.: US 12,682,895 B1
(45) Date of Patent: Jul. 14, 2026

(54) PRESENTING A TEXT REPRESENTATION OF AUDIBLE SIGNAL DATA BASED ON LANGUAGE CONTEXT

(71) Applicant: Apple Inc., Cupertino, CA (US)

(72) Inventors: Ioana Negoita, San Jose, CA (US); Brian W. Temple, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 484 days.

(21) Appl. No.: 18/136,905

(22) Filed: Apr. 20, 2023

Related U.S. Application Data

(60) Provisional application No. 63/333,839, filed on Apr. 22, 2022.

(51) Int. Cl.
| | |
|---|---|
| *G10L 15/00* | (2013.01) |
| *G06F 40/166* | (2020.01) |
| *G10L 13/02* | (2013.01) |
| *G10L 15/183* | (2013.01) |
| *G10L 15/22* | (2006.01) |
| *G10L 15/30* | (2013.01) |

(52) U.S. Cl.
CPC .......... *G10L 15/183* (2013.01); *G06F 40/166* (2020.01); *G10L 13/02* (2013.01); *G10L 15/005* (2013.01); *G10L 15/22* (2013.01); *G10L 15/30* (2013.01)

(58) Field of Classification Search
CPC ...... G06F 40/30; G06F 40/211; G06F 40/253; G06F 40/268; G06F 40/284; G06F 40/55; G06F 40/58; G06F 40/166; G10L 15/16;

G10L 19/005; G10L 19/00; G10L 25/27; G10L 25/30; G10L 15/02; G10L 15/12; G10L 15/07; G10L 15/20; G10L 15/22; G10L 15/26; G10L 15/30; G10L 15/08; G10L 15/14; G10L 15/1815; G10L 15/197; G10L 15/1822; G10L 15/183; G10L 15/193; G10L 15/19; G10L 15/005; G10L 13/02

See application file for complete search history.

(56) References Cited

U.S. PATENT DOCUMENTS

| | | | |
|---|---|---|---|
| 10,433,052 B2 | 10/2019 | Zass et al. | |
| 10,516,938 B2 | 12/2019 | Zass | |
| 10,762,114 B1 * | 9/2020 | Annunziata | G06F 9/54 |
| 11,017,766 B2 * | 5/2021 | Chao | G10L 13/00 |
| 11,114,091 B2 * | 9/2021 | Xiong | G06F 40/205 |
| 11,195,542 B2 | 12/2021 | Zass | |
| 11,507,759 B2 * | 11/2022 | Furukawa | G06F 40/58 |

(Continued)

*Primary Examiner* — Vu B Hang
(74) *Attorney, Agent, or Firm* — Fernando & Partners, LLP

(57) ABSTRACT

Various implementations disclosed herein include devices, systems, and methods for presenting text representations of audible signal data based on language context. In some implementations, a first device includes a display, one or more processors, and a memory. The first device receives a first text representation of an audio signal corresponding to a spoken phrase detected at a second device. The first device determines a second text representation based on the first text representation, first language context information associated with the first device, and second language context information associated with the second device. The second text representation is presented via an output device.

24 Claims, 6 Drawing Sheets

(56) References Cited

U.S. PATENT DOCUMENTS

| 11,620,328 | B2 * | 4/2023 | DeLuca | ................. | G06F 40/40 |
| | | | | | 704/235 |
| 11,837,249 | B2 | 12/2023 | Zass | | |
| 11,887,600 | B2 * | 1/2024 | Doggett | ............... | G10L 15/063 |
| 2024/0055014 | A1 | 2/2024 | Zass | | |

* cited by examiner

Environment 106

50

122

120 words

150

Database
132

Language
context
info 130

110

20

Electronic
device 100

Content presentation
engine 200

Figure 1B:
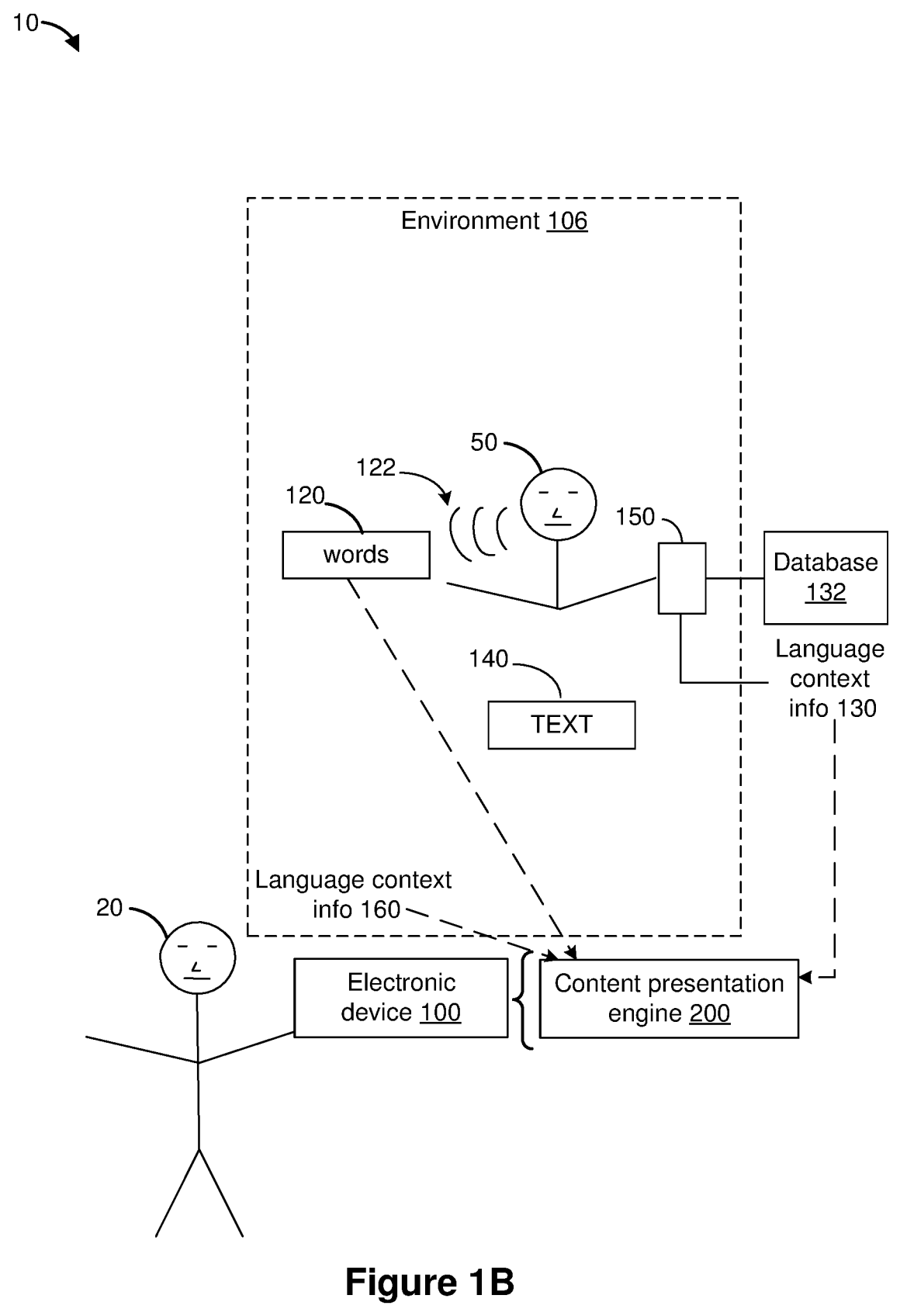

10

Environment 106

50

122

120 words

150

Database
132

140

Language
context
info 130

TEXT

20

Language context
info 160

Electronic
device 100

Content presentation
engine 200

2<sup>nd</sup> language
context info 216,
1<sup>st</sup> language
context info 218

First text
representation 212

Audible signal
data 214

Data obtainer
210

Text
determiner
220

Second text
representation 222

Video
data 234

Text
compositor
230

Display
232

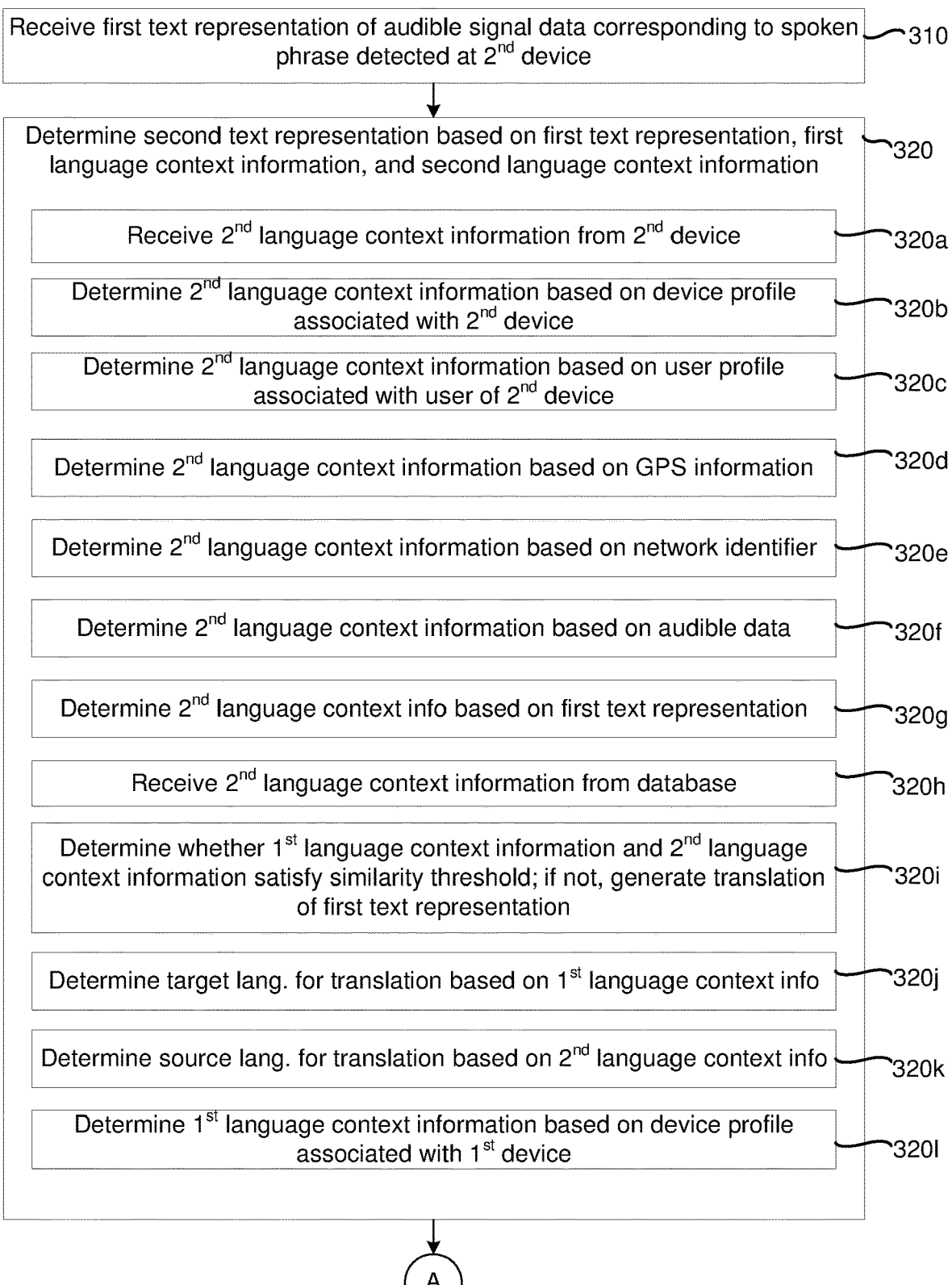

300

Receive first text representation of audible signal data corresponding to spoken phrase detected at 2$^{nd}$ device — 310

Determine second text representation based on first text representation, first language context information, and second language context information — 320

Receive 2$^{nd}$ language context information from 2$^{nd}$ device — 320a

Determine 2$^{nd}$ language context information based on device profile associated with 2$^{nd}$ device — 320b Determine 2$^{nd}$ language context information based on user profile associated with user of 2$^{nd}$ device — 320c Determine 2$^{nd}$ language context information based on GPS information — 320d Determine 2$^{nd}$ language context information based on network identifier — 320e Determine 2$^{nd}$ language context information based on audible data — 320f Determine 2$^{nd}$ language context info based on first text representation — 320g Receive 2$^{nd}$ language context information from database — 320h Determine whether 1$^{st}$ language context information and 2$^{nd}$ language context information satisfy similarity threshold; if not, generate translation of first text representation — 320i Determine target lang. for translation based on 1$^{st}$ language context info — 320j Determine source lang. for translation based on 2$^{nd}$ language context info — 320k Determine 1$^{st}$ language context information based on device profile associated with 1$^{st}$ device — 320l

PRESENTING A TEXT REPRESENTATION OF AUDIBLE SIGNAL DATA BASED ON LANGUAGE CONTEXT

CROSS-REFERENCE TO RELATED APPLICATIONS

This application claims the benefit of U.S. Provisional Patent App. No. 63/333,839, filed on Apr. 22, 2022, which is incorporated by reference in its entirety.

TECHNICAL FIELD

The present disclosure generally relates to computer-mediated communications.

BACKGROUND

Some devices are capable of generating and presenting graphical environments that include many objects. These objects may mimic real world objects. These environments may be presented on mobile communication devices. Users of such devices may communicate with one another.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1B are diagrams of an example operating environment in accordance with some implementations.

FIGS. 3A-3B are a flowchart representation of a method of presenting a text representation of audible signal data in accordance with some implementations.

Figure 1A:

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for presenting a text representation of audible signal data. In some implementations, a first device includes an output device, one or more processors, and a memory. The first device receives a first text representation of audible signal data corresponding to a spoken phrase detected at a second device. The first device determines a second text representation based on the first text representation, first language context information associated with the first device, and second language context information associated with the second device. The text representation is presented via the output device.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices display an extended reality (XR) environment that includes one or more objects, e.g., virtual objects. A user may select or otherwise interact with the objects through a variety of modalities. For example, some devices allow a user to select or otherwise interact with objects using a gaze input. A gaze-tracking device, such as a user-facing image sensor, may obtain an image of the user's pupils. The image may be used to determine a gaze vector. The gaze-tracking device may use the gaze vector to determine which object the user intends to select or interact with.

The present disclosure provides methods, systems, and/or devices for presenting a text representation of audible signal data based on language context information. In various implementations, a first device receives a first text representation of audible signal data corresponding to a spoken phrase detected at a second device. For example, respective users of the first device and the second device may enable an audio visualization mode (e.g., a transcript mode, a closed caption mode and/or a translation mode). In some implementations, each user's device detects the respective user's speech and transcribes the detected speech to text. The first device may transmit first transcribed text and first language context information to the second device, and the second device may transmit second transcribed text and second language context information to the first device.

In some implementations, the first language context information can indicate a language, a dialect, a linguistic style, a vocabulary, a verbosity and/or a location associated with the first device. For example, the first language context information may indicate a preferred language of a user of the first device, whether or not the user uses slangs (e.g., "what's up?" instead of "what are you doing?"), whether the user prefers long phrases/sentences over short phrases/sentences, and/or a home location of the first device (e.g., a geographic region with which the first device is registered). Similarly, the second language context information can indicate a language, a dialect, a linguistic style, a vocabulary, a verbosity and/or a location associated with the second device. For example, the second language context information may indicate a preferred language of a user of the second device, whether or not the user of the second device uses slangs (e.g., "what's up?" instead of "what are you doing?"), whether the user of the second device prefers long phrases/sentences over short phrases/sentences, and/or a home location of the second device (e.g., a geographic region with which the second device is registered).

The first device may determine a second text representation based on the first text representation, the first language context information associated with the first device, and the second language context information associated with the second device. Determining the second text representation may include translating the first text representation. The first device may determine whether the first text representation received from the second device is associated with a first language indicated by the first language context information, e.g., whether the first text representation is in a preferred language of a user of the first device. If the first text representation received from the second device is in a second language that is different from the first language, the first device may translate the first text representation from the second language to the first language that is associated with the first device. In some implementations, the first device causes the second text representation to be presented (e.g., by displaying the second text representation on the display, or by generating and playing an audio version of the second text representation via a speaker).

Determining the second text representation may include modifying a dialect of the first text representation. The first device may determine whether the first text representation received from the second device is associated with a first dialect indicated by the first language context information, e.g., whether the first text representation uses a preferred dialect of a user of the first device. If the first text representation received from the second device uses a second dialect that is different from the first dialect, the first device may convert the first text representation from the second dialect to the first dialect that is associated with the first device.

Determining the second text representation may include modifying a linguistic characteristic of the first text representation. The first device may determine whether the first text representation received from the second device is associated with a first linguistic characteristic indicated by the first language context information, e.g., whether the first text representation uses a preferred linguistic style of a user of the first device. If the first text representation received from the second device uses a second linguistic characteristic that is different from the first linguistic characteristic, the first device may modify the first text representation to use the first linguistic characteristic that is associated with the first device.

As an example, if the user of the first device prefers short sentences over long sentences, the first device can segment (e.g., break-up) long sentences in the first text representation to generate the second text representation with shorter sentences. As another example, if the user of the first device prefers to read full words instead of abbreviations, the first device can expand abbreviations in the first text representation to generate the second text representation with full words. As another example, if the user of the first device prefers Shakespearean English over modern English, the first device can convert the first text representation from modern English to Shakespearean English.

Determining the second text representation may include changing a vocabulary of the first text representation. The first device may determine whether the first text representation received from the second device uses phrases from a first vocabulary indicated by the first language context information, e.g., whether the first text representation uses phrases that the user of the first device prefers to use. If the first text representation received from the second device uses a second vocabulary that is different from the first vocabulary, the first device can replace phrases in the first text representation with phrases from the first vocabulary that is associated with the first device. As another example, if the user of the first device prefers U.S. English over U.K. English, the first device can convert the first text representation from U.K. English to U.S. English (e.g., by replacing "colour" with "color", etc.).

Determining the second text representation may include changing a verbosity of the first text representation. The first device may determine whether the first text representation received from the second device is at a first level of verbosity indicated by the first language context information, e.g., whether a wordiness of the first text representation matches a preferred level of wordiness of the user of the first device. If the first text representation received from the second device uses a second level of verbosity that is different from the first level of verbosity, the first device can change the verbosity of the first text representation to generate the second text representation with the first level of verbosity. For example, if the first text representation is too wordy, the first device can generate a shorter version of the first text representation (e.g., a summary of the first text representation) that is less wordy than the first text representation.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a first electronic device 100, a second electronic device 150, and a content presentation engine 200. In some implementations, the first electronic device 100 includes a handheld computing device that can be held by a user 20. For example, in some implementations, the first electronic device 100 includes a smartphone, a tablet, a media player, a laptop, or the like. In some implementations, the first electronic device 100 includes a wearable computing device that can be worn by the user 20. For example, in some implementations, the first electronic device 100 includes a head-mountable device (HMD) or an electronic watch.

In the example of FIG. 1A, the content presentation engine 200 resides at the first electronic device 100. For example, the first electronic device 100 implements the content presentation engine 200. In some implementations, the first electronic device 100 includes a set of computer-readable instructions corresponding to the content presentation engine 200. Although the content presentation engine 200 is shown as being integrated into the first electronic device 100, in some implementations, the content presentation engine 200 is separate from the first electronic device 100. For example, in some implementations, the content presentation engine 200 resides at another device (e.g., at the second electronic device 150, a controller, a server or a cloud computing platform).

As illustrated in FIG. 1A, in some implementations, the first electronic device 100 presents an extended reality (XR) environment 106 that corresponds to (e.g., includes) a field of view of the user 20. In some implementations, the XR environment 106 is referred to as a computer graphics environment. In some implementations, the XR environment 106 is referred to as a graphical environment. In some implementations, the first electronic device 100 generates the XR environment 106. Alternatively, in some implementations, the first electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the first electronic device 100. In such implementations, the XR environment 106 is different from a physical environment in which the first electronic device 100 is located. In some implementations, the XR environment 106 includes an augmented environment that is a modified version of a physical environment. For example, in some implementations, the first electronic device 100 modifies (e.g., augments) the physical environment in which the first electronic device 100 is located to generate the XR environment 106 (e.g., by displaying virtual content overlaid on a video pass-through representation of the physical environment using an opaque display or on a view of the physical environment through an at least partially transparent display). In some implementations, the first electronic device 100 generates the XR environment 106 by simulating a replica of the physical environment in which the first electronic device 100 is located. In some implementations, the first electronic device 100 generates the XR environment 106 by removing and/or adding items from the simulated replica of the physical environment in which the first electronic device 100 is located. In some implementations, the XR environment 106 represents a communication session between the first electronic device 100 and the second electronic device 150. For example, the XR environment 106 corresponds to a video call between the first electronic device 100 and the second electronic device 150.

In some implementations, the XR environment 106 includes various virtual objects such as an XR object 110 ("object 110", hereinafter for the sake of brevity). In some implementations, the XR environment 106 includes multiple objects. In some implementations, the virtual objects are referred to as graphical objects or XR objects. In various implementations, the first electronic device 100 obtains the objects from an object datastore (not shown). For example, in some implementations, the first electronic device 100 retrieves the object 110 from the object datastore. In some implementations, the virtual objects represent physical articles. For example, in some implementations, the virtual objects represent equipment (e.g., machinery such as planes, tanks, robots, motorcycles, etc.). In some implementations, the virtual objects represent fictional elements (e.g., entities from fictional materials, for example, an action figure or a fictional equipment such as a flying motorcycle).

In various implementations, the first electronic device 100 (e.g., the content presentation engine 200) receives a first text representation 120 of an audio signal 122 that corresponds to a spoken phrase detected at the second electronic device 150. For example, a user 50 of the second electronic device 150 may participate in a communication session with the user 20. The communication session may include audio and/or video components. The second electronic device 150 may include an audio sensor that detects the audio signal 122. In some implementations, the second electronic device 150 converts the audio signal 122 into audible signal data that is transmitted to the first electronic device 100. In some implementations, the second electronic device 150 generates the first text representation 120 based on the audio signal 122, for example, using speech-to-text conversion on the audible signal data. In some implementations, the second electronic device 150 generates the first text representation 120 based on the audio signal 122 using a speech-to-text language model that is specific to a language context (e.g., a language, a dialect and/or a locale) of the second electronic device 150 or user of the second electronic device 150. In some implementations, the second electronic device 150 generates the first text representation 120 in response to a user input that enables an audio visualization mode (e.g., a transcript mode or a closed caption mode). The user input may be received from one or more of the user 20 and/or the user 50.

In some implementations, the first electronic device 100 and the second electronic device 150 are participating in a video call. In such implementations, the first electronic device 100 receives audible signal data that corresponds to the audio signal 122, and the first electronic device 100 can generate the first text representation 120 based on the audible signal data that corresponds to the audio signal 122. In some implementations, the first electronic device 100 receives the audio signal 122 at a microphone of the first electronic device 100, and the first electronic device 100 can generate the first text representation 120 based on audible signal data that corresponds to the audio signal 122.

In some implementations, the second electronic device 150 determines language context information 130 that is associated with the second electronic device 150. In some implementations, the language context information 130 indicates a primary language associated with the second electronic device 150 (e.g., a default language of the second electronic device 150 or a preferred language of the user 50). In some implementations, the language context information 130 indicates a location that is associated with the second electronic device 150 (e.g., a home location of the second electronic device 150). The second electronic device 150 may determine the language context information 130 based on information available to the second electronic device 150. For example, in some implementations, the second electronic device 150 determines the language context information 130 based on a device profile that is associated with the second electronic device 150. The device profile may associate the second electronic device 150 with a geographic region, such as a country where a particular language is spoken. In some implementations, the second electronic device 150 determines the language context information 130 based on a user profile that is associated with the user 50. For example, the user profile may indicate a preferred language of the user 50. As another example, the user profile may associate the user 50 with a geographic region, such as a country where a particular language is spoken. In some implementations, the second electronic device 150 determines the language context information 130 based on GPS information, which may be mapped to a geographic region where a particular language is spoken. The second electronic device 150 may determine the language context information 130 based on a network identifier, such as a cell identifier or an SSID, which may be associated with a geographic region where a particular language is spoken.

In some implementations, the second electronic device 150 determines the language context information 130 based on the audio signal 122. For example, the second electronic device 150 may detect a spoken language associated with a spoken phrase based on the audio signal 122. The second electronic device 150 may determine the language context information 130 based on the spoken language.

In some implementations, the second electronic device 150 determines the language context information 130 based on the first text representation 120. For example, the second electronic device 150 may analyze the first text representation 120 to determine a language represented in the first text representation 120. The second electronic device 150 may determine the language context information 130 based on the language.

In some implementations, the second electronic device 150 receives the language context information 130 from a database 132. The database 132 may store data associating electronic devices, including the second electronic device 150, with respective geographic regions. For example, the database 132 may reside at a network element (e.g., a cellular network element such as a Home Location Register (HLR)) that stores a home location of the second electronic device 150.

The language context information 130 may include geographic information. The geographic information may include a country identifier. In some implementations, the geographic information includes a political subdivision of a country, e.g., a province or a state. In some implementations, the language context information 130 includes a language identifier. For example, the language context information 130 may specify that the user resides in Canada and speaks English or French.

In some implementations, the language context information 130 may indicate a linguistic preference of the user 50. For example, the language context information 130 may indicate whether the user 50 likes to use relatively large words, phrases or sentences over relatively small words, phrases or sentences. In some implementations, the language context information 130 may indicate a vocabulary of the user 50. For example, the language context information 130 may indicate whether the user 30 tends to use medical terms, legal terms or engineering terms when speaking. In some implementations, the language context information 130 may indicate a verbosity (e.g., a wordiness) of speech uttered by the user 50.

In some implementations, the second electronic device 150 transmits (e.g., streams) the first text representation 120 and the language context information 130 to the first electronic device 100. Audible signal data corresponding to the audio signal 122 may also be transmitted to the first electronic device 100. In some implementations, the second electronic device 150 transmits video signal data (e.g., a video feed) to the first electronic device 100. The video signal data may include, for example, a two-dimensional (2D) representation of the user 20.

As represented in FIG. 1B, in some implementations, the first electronic device 100 receives the first text representation 120 and the language context information 130, and determines a second text representation 140. The second text representation 140 is determined based on the first text representation 120, the language context information 130 associated with the second electronic device 150, and language context information 160 that is associated with the first electronic device 100.

In some implementations, the language context information 160 indicates a language that is associated with the first electronic device 100. For example, in some implementations, the language context information 160 indicates a default language of the first electronic device 100. In some implementations, the language context information 160 indicates a language preference of the user 20 of the first electronic device 100. In some implementations, the first electronic device 100 determines the language preference of the user 20 based on a language of content that the user 20 has previously viewed. In some implementations, the first electronic device 100 determines the language preference of the user 20 based on a language that the user 20 speaks in. In some implementations, the language context information 160 indicates a dialect of the user 20.

In some implementations, the language context information 160 indicates a linguistic characteristic (e.g., a linguistic preference) of the user 20. For example, in some implementations, the language context information 160 indicates whether or not the user 20 prefers to read slangs (e.g., "what's up?" instead of "what are you up to?"). In some implementations, the language context information 160 indicates whether the user 20 prefers to read relatively long words, phrases or sentences over relatively short words, phrases or sentences. In some implementations, the language context information 160 indicates whether the user 20 has a particular vocabulary. For example, the language context information 160 may indicate whether the user 20 prefers to read text with medical terms, legal terms or engineering terms. In some implementations, the language context information 160 indicates whether or not the user 20 prefers to read verbose (e.g., wordy) text.

In some implementations, the language context information 160 indicates a location that is associated with the first electronic device 100 (e.g., a home location of the first electronic device 100). The first electronic device 100 may determine the language context information 160 based on information available to the first electronic device 100. For example, in some implementations, the first electronic device 100 determines the language context information 160 based on a device profile that is associated with the first electronic device 100. The device profile may associate the first electronic device 100 with a geographic region, such as a country where a language is predominantly spoken or where a language is spoken in a particular manner (e.g., with a particular linguistic style or using a particular vocabulary). In some implementations, the first electronic device 100 determines the language context information 160 based on a user profile that is associated with the user 20. For example, the user profile may associate the user 20 with a geographic region, such as a country with a predominant language or a predominant speaking style. In some implementations, the first electronic device 100 determines the language context information 160 based on GPS information, which may be mapped to a geographic region with a predominant language or a predominant linguistic style. The first electronic device 100 may determine the language context information 160 based on a network identifier, such as a cell identifier or an SSID, which may be associated with a geographic region with a predominant language or a predominant speaking style. In some implementations, the first electronic device 100 determines the language context information 160 by monitoring content that the user 20 views on the first electronic device 100. For example, the first electronic device 100 can identify a set of linguistic preferences of the user 20 by determining linguistic characteristics (e.g., formality, vocabulary, verbosity, etc.) of content that the user 20 has previously viewed via the first electronic device 100.

In some implementations, the second text representation 140 is a transcription of the audio signal 122, e.g., the first text representation 120 may be used as the second text representation 140. In some implementations, the first electronic device 100 determines to generate a translation of the first text representation 120 into a target language. The first electronic device 100 may determine to generate the translation of the first text representation 120 in response to a user input that enables a translation mode. In some implementations, the first electronic device 100 determines to generate the translation in response to determining that the first electronic device 100 and the second electronic device 150 are associated with different languages, e.g., the language context information 130 and the language context information 160 indicate different languages. In some implementations, the first electronic device 100 determines to generate the translation in response to determining that the user 20 and the user 50 are associated with different preferred languages. In some implementations, the first electronic device 100 determines to generate the translation in response to determining that the audio signal 122 or the first text representation 120 is in a different language than a preferred language of the user 20 or a default language of the first electronic device 100.

The target language may be associated with the language context information 160. In some implementations, the target language is associated with the user 20, independently of a location of the first electronic device 100. For example, the user 20 may specify that the user 20 wishes to read the second text representation 140 in a preferred language that is different from a language associated with a current location of the first electronic device 100.

In some implementations, the first electronic device 100 generates the second text representation 140 as a function of audible signal data that corresponds to the audio signal 122. For example, if the first text representation 120 is unavailable, unreliable, or is determined to contain inaccurate information, the first electronic device 100 may generate the second text representation 140 using the audible signal data to reconstruct the dialog. In some implementations, the first electronic device 100 generates an audio output signal based on the second text representation 140. For example, if the audible signal data corresponding to the audio signal 122 is of poor audio quality, the first electronic device 100 may use the second text representation 140 to synthesize a replacement audio signal to be output, e.g., from speakers associated with the first electronic device 100.

After generating the second text representation 140, the first electronic device 100 may cause the second text representation 140 to be displayed. In some implementations, the second text representation 140 is displayed in the XR environment 106. The second text representation 140 may be displayed in connection with (e.g., adjacent to) a representation of the user 50. In some implementations, the second text representation 140 is displayed in a designated area of the XR environment 106, e.g., at a lower area of the field of view. In some implementations, the first electronic device 100 causes an audio version of the second text representation 140 to be played via a speaker.

In some implementations, the first electronic device 100 includes or is attached to a head-mountable device (HMD) worn by the user 20. The HMD presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the first electronic device 100 can be attached to the head-mountable enclosure. In various implementations, the head-mountable enclosure is shaped to form a receptacle for receiving another device that includes a display (e.g., the first electronic device 100). For example, in some implementations, the first electronic device 100 slides/snaps into or otherwise attaches to the head-mountable enclosure. In some implementations, the display of the device attached to the head-mountable enclosure presents (e.g., displays) the XR environment 106. In various implementations, examples of the first electronic device 100 include smartphones, tablets, media players, laptops, etc.

Figure 2:
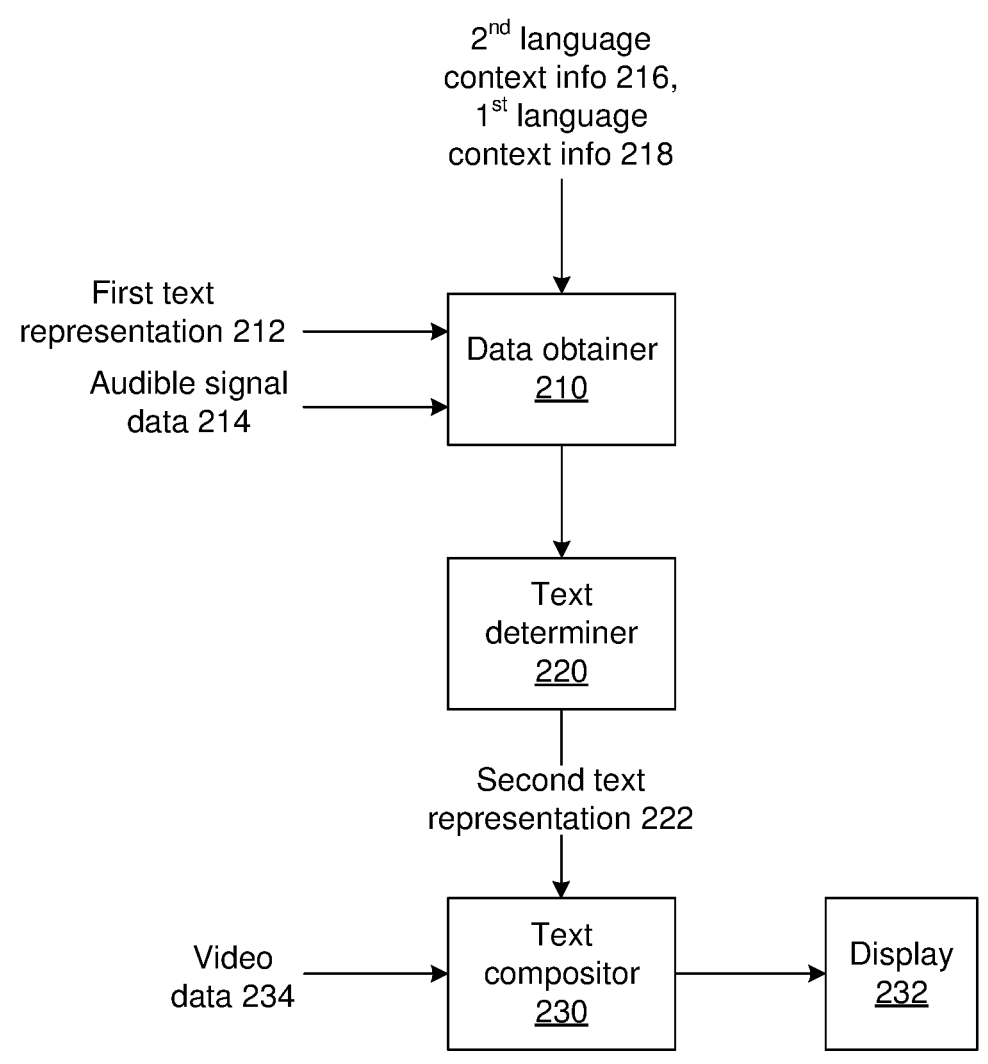
FIG. 2 is a block diagram of a content presentation engine in accordance with some implementations.

FIG. 2 illustrates a block diagram of the content presentation engine 200 in accordance with some implementations. In some implementations, the content presentation engine 200 includes a data obtainer 210, a text determiner 220, and a text compositor 230. In various implementations, the data obtainer 210 receives a first text representation 212 of audible signal data (hereafter "audio signal 214") that corresponds to a spoken phrase detected at a second device (e.g., the first text representation 120 of the audio signal 122 shown in FIG. 1A). For example, a user of the second electronic device may participate in a communication session with a user of a device with which the content presentation engine 200 is associated. The communication session may include audio and/or video components. The second electronic device may include an audio sensor that detects the audio signal 214. In some implementations, the second electronic device generates the first text representation 212 based on the audio signal 214, for example, using speech-to-text conversion. The first text representation 212 may include cues separate from the spoken text of the communication session. For example, the first text representation 212 may include closed captions that include indicators of non-speech sounds and/or indicators of the identity of a speaker. In some implementations, the second electronic device generates the first text representation 212 in response to a user input that enables an audio visualization mode (e.g., a transcript mode or a closed caption mode). The user input may be received from one or more of the participants in the communication session.

In some implementations, the data obtainer 210 obtains (e.g., receives or determines) second language context information 216 associated with the second electronic device (e.g., the language context information 130 shown in FIGS. 1A and 1B). In some implementations, the data obtainer 210 obtains (e.g., receives or determines) first language context information 218 associated with the first electronic device (e.g., the language context information 160 shown in FIG. 1B).

In some implementations, the text determiner 220 determines a second text representation 222 (e.g., the second text representation 140 shown in FIG. 1B) based on the first text representation 212, the first language context information 218 associated with the device with which the content presentation engine 200 is associated, and the second language context information 216 that is associated with the second device. The second language context information 216 may indicate a language that is associated with the second device or a user of the second device. The second language context information 216 may indicate a location that is associated with the second device. The second language context information 216 may be determined by the second device or the data obtainer 210, for example, based on information available to the second device or the data obtainer 210, such as a device profile that is associated with the second device or a user profile that is associated with a user of the second device. The device profile or the user profile may associate the second device or the user of the second device with a particular language, a dialect, a set of linguistic preferences and/or a particular geographic region such as a country where a particular language is spoken. In some implementations, the second language context information 216 is determined based on GPS information, which may be mapped to a geographic region where a particular language is spoken. In some implementations, the second language context information 216 is determined based on a network identifier, such as a cell identifier or an SSID, which may be associated with a geographic region where a particular language is spoken.

In some implementations, the second language context information 216 is determined based on the audio signal 214. For example, the second device or the data obtainer 210 may detect a spoken language associated with a spoken phrase based on the audio signal 214. The second device or the data obtainer 210 may determine the second language context information 216 based on the spoken language. In some implementations, the second device or the data obtainer 210 determines the second language context information 216 based on the first text representation 212. For example, the second device or the data obtainer 210 may analyze the first text representation 212 to determine a language represented in the first text representation 212. The second device or the data obtainer 210 may determine the second language context information 216 based on the language. In some implementations, the second language context information 216 can be determined by the first device in the same way as described above.

The second language context information 216 may include geographic information, such as a country identifier and/or an identifier of a political subdivision of a country, such as a province or a state where a particular language is spoken. For example, the second language context information 216 may specify that the second device is associated with a majority-English or a majority-French speaking province of Canada. In some implementations, the second language context information 216 additionally or alternatively includes a language identifier. For example, the second language context information 216 may specify that the user resides in Canada and speaks English or French.

In some implementations, the data obtainer 210 obtains the second language context information 216 from the second device. In some implementations, the data obtainer 210 obtains the second language context information 216 from a database (e.g., the database 132 shown in FIGS. 1A and 1B). The database may store data associating electronic devices and/or users with respective geographic regions where respective languages are spoken. In some implementations, the data obtainer 210 determines (e.g., generates) the second language context information 216 in the same way as described above.

In some implementations, the data obtainer 210 obtains (e.g., receives) the first text representation 212 and the second language context information 216 from the second device. The data obtainer 210 may also obtain the audio signal 214 from the second device. In some implementations, the data obtainer 210 obtains (e.g., receives) a video signal data from the second device. The video signal data may include, for example, a representation of a user of the second device.

In some implementations, the text determiner 220 determines a second text representation 222 corresponding to the first text representation 212 or audio signal 214. The second text representation 222 may be determined based on the first text representation 212, first language context information 218 associated with the content presentation engine 200, and the second language context information 216.

In some implementations, the first language context information 218 indicates a language that is associated with the first device (e.g., the first electronic device 100 shown in FIGS. 1A and 1B). For example, as described in relation to FIG. 1B, in some implementations, the first language context information 218 may indicate a default language of the first device or a preferred language of a user of the first device. In some implementations, the first language context information 218 indicates a linguistic style associated with the first device (e.g., linguistic preference(s) of the user of the first device). For example, the first language context information 218 may indicate whether the user likes to read slangs (e.g., "what's up?") or formal phrases (e.g., "what are you up to?"). As another example, the first language context information 218 may indicate whether the user prefers to read full words or abbreviations. As another example, the first language context information 218 may indicate a favorite book genre of the user (e.g., science fiction). In some implementations, the first language context information 218 indicates a language that is typically spoken in a home location of the first device. In some implementations, the content presentation engine 200 (e.g., the data obtainer 210) determines the first language context information 218 based on content that has been previously displayed on the display 232 (e.g., based on languages and/or linguistic characteristics of books, magazines or websites that the user has previously viewed). In some implementations, the content presentation engine 200 determines the first language context information 218 based on the user's previous speech. For example, the content presentation engine 200 may determine that the user prefers full words over abbreviations if the user's prior speech includes full words instead of abbreviations (e.g., "corporation" instead of "Corp.").

The first language context information 218 may be determined based on information available to the content presentation engine 200. For example, in some implementations, the first language context information 218 is determined based on a device profile that is associated with the device in which the content presentation engine 200 is implemented. The device profile may be associated with a geographic region, such as a country where a particular language is spoken or where a language is spoken in a particular manner (e.g., with a particular vocabulary or with a particular linguistic style). In some implementations, the first language context information 218 is determined based on a user profile that is associated with a user. For example, the user profile may associate the user with a geographic region, such as a country with a predominant language or a predominant speaking style. In some implementations, the first language context information 218 is determined based on GPS information, which may be mapped to a geographic region with a predominant language or a predominant linguistic characteristic. The first language context information 218 may be determined based on a network identifier, such as a cell identifier or an SSID, which may be associated with a geographic region with a predominant language or a predominant linguistic characteristic.

In some implementations, e.g., if the first language context information 218 and the second language context information 216 are within a degree of similarity to one another, the second text representation 222 is a transcription of the audio signal 214, e.g., the first text representation 212 may be used as the second text representation 222. In some implementations, e.g., if the first language context information 218 and the second language context information 216 are at least a threshold level of difference from one another, the text determiner 220 determines to generate a translation of the first text representation 212 into a target language. The text determiner 220 may determine to generate the translation of the first text representation 212 in response to a user input that enables a translation mode. In some implementations, the text determiner 220 determines to generate the translation in response to determining that the content presentation engine 200 and the second device are associated with different locales, e.g., the first language context information 218 and the second language context information 216 are associated with different geographic regions where different languages are spoken or the same language is spoken with different speaking styles. In some implementations, the text determiner 220 determines to generate the translation in response to determining that the content presentation engine 200 and the second device are associated with different languages, e.g., the first language context information 218 and the second language context information 216 are associated with geographic regions associated with different languages or the same language with different speaking styles. In some implementations, the text determiner 220 determines to generate the translation in response to determining that the respective users of the content presentation engine 200 and the second device are associated with different locales, e.g., different geographic regions with different linguistic preferences. In some implementations, the text determiner 220 determines to generate the translation in response to determining that the first text representation 212 or the audio signal 214 corresponds to a different language than the target language. In some implementations, the first language context information 218 may specify a user-specified target language, for example, the user may specify that the user wishes to hear or read the second text representation 222 in a preferred language that is different from a language associated with a geographic region of the content presentation engine 200.

In some implementations, the second text representation 222 is in the same language as the first text representation 212 but may have spelling or vocabulary differences as compared with the first text representation 212. For example, if the first language context information 218 corresponds to the United States and the second language context information 216 corresponds to the United Kingdom, the text determiner 220 may replace United Kingdom spellings and vocabulary in the first text representation 212 with United States equivalents (e.g., replace "colour" with "color", replace "traveller" with "traveler", replace "flat" with "apartment", etc.).

In some implementations, the text determiner 220 generates the second text representation 222 as a function of the audio signal 214. For example, if the first text representation 212 is unavailable, unreliable, or is determined to contain inaccurate information, the text determiner 220 may generate the second text representation 222 using the audio signal 214 to reconstruct the dialog. In some implementations, the text determiner 220 may use the second language context information 216 to perform speech-to-text conversion using a language model that is specific to a locale of the audio signal 214. In some implementations, the text determiner 220 generates an audio output signal based on the second text representation 222. For example, if the audio signal 214 is of poor audio quality, the text determiner 220 may use the second text representation 222 to synthesize a replacement audio signal to be output.

In some implementations, the first language context information 218 indicates a first dialect and the second language context information 216 indicates a second dialect that is different from the first dialect. The text determiner 220 generates the second text representation 222 by converting the first text representation 212 from the second dialect to the first dialect.

In some implementations, the first language context information 218 indicates a first linguistic characteristic and the second language context information 216 indicates a second linguistic characteristic that is different from the first linguistic characteristic. The text determiner 220 generates the second text representation 222 by changing a linguistic characteristic of the first text representation 212 from the second linguistic characteristic to the first linguistic characteristic. Examples of linguistic characteristics include vocabulary (e.g., U.S. English vs. U.K. English), literary style (e.g., modern English vs. Shakespearean English), formality (e.g., formal language vs. informal language with slangs) and verbosity (e.g., wordiness).

In some implementations, the text compositor 230 causes the second text representation 222 to be displayed on a display 232. The text compositor 230 may composite the second text representation 222 with video data 234 representing the video content of a communication session to generate video output data that is output to the display 232. In some implementations, the second text representation 222 is displayed in an XR environment. The second text representation 222 may be displayed in connection with a representation of a user, such as the user corresponding to the audio signal 214. In some implementations, the second text representation 222 is displayed in a designated area of the XR environment, e.g., at a lower area of the field of view. In some implementations, the second text representation 222 is overlaid adjacent to or onto a representation of a person (e.g., the user 50 shown in FIGS. 1A and 1B) that is uttering the spoken phrase. In some implementations, a portion of the second text representation 222 may be displayed as additional portions of the second text representation 222 are being generated by the text determiner 220. For example, the content presentation engine 200 may cause the display 232 to display a text representation that corresponds to a beginning portion of a sentence while the text determiner 220 is generating a text representation for a remainder of the sentence. Additionally, previously displayed portions of second text representation 222 may be modified or corrected by the text determiner 220 thereby generating an updated second text representation 222. For example, a determined text representation of the beginning of a sentence may change based on subsequently acquired knowledge of the later portions of the sentence.

In some implementations, the content presentation engine 200 may additionally or alternatively output an audio version of second text representation 222 via one or more speakers. For example, the content presentation engine 200 may perform a text-to-speech process on the second text representation 222 using a default or user-selected voice. The audio version may be output in mono, stereo, or spatialized such that it is perceived to emanate from a position in the environment (e.g., at a location corresponding to a user of the second device). In some implementations, a portion of second text representation 222 may be output as audio as additional portions of second text representation 222 are being generated by the text determiner 220. For example, the content presentation engine 200 may cause one or more speakers to output an audio version of a text representation that corresponds to a beginning portion of a sentence while the text determiner 220 is generating a text representation for a remainder of the sentence. In other implementations, the content presentation engine 200 may refrain from outputting an audio version of second text representation 222 until a completed version of the second text representation 222 is available. For example, the content presentation engine 200 may play an audio version of a sentence or a phrase after receiving the second text representation 222 for the entire sentence or the entire phrase.

Figure 3B:
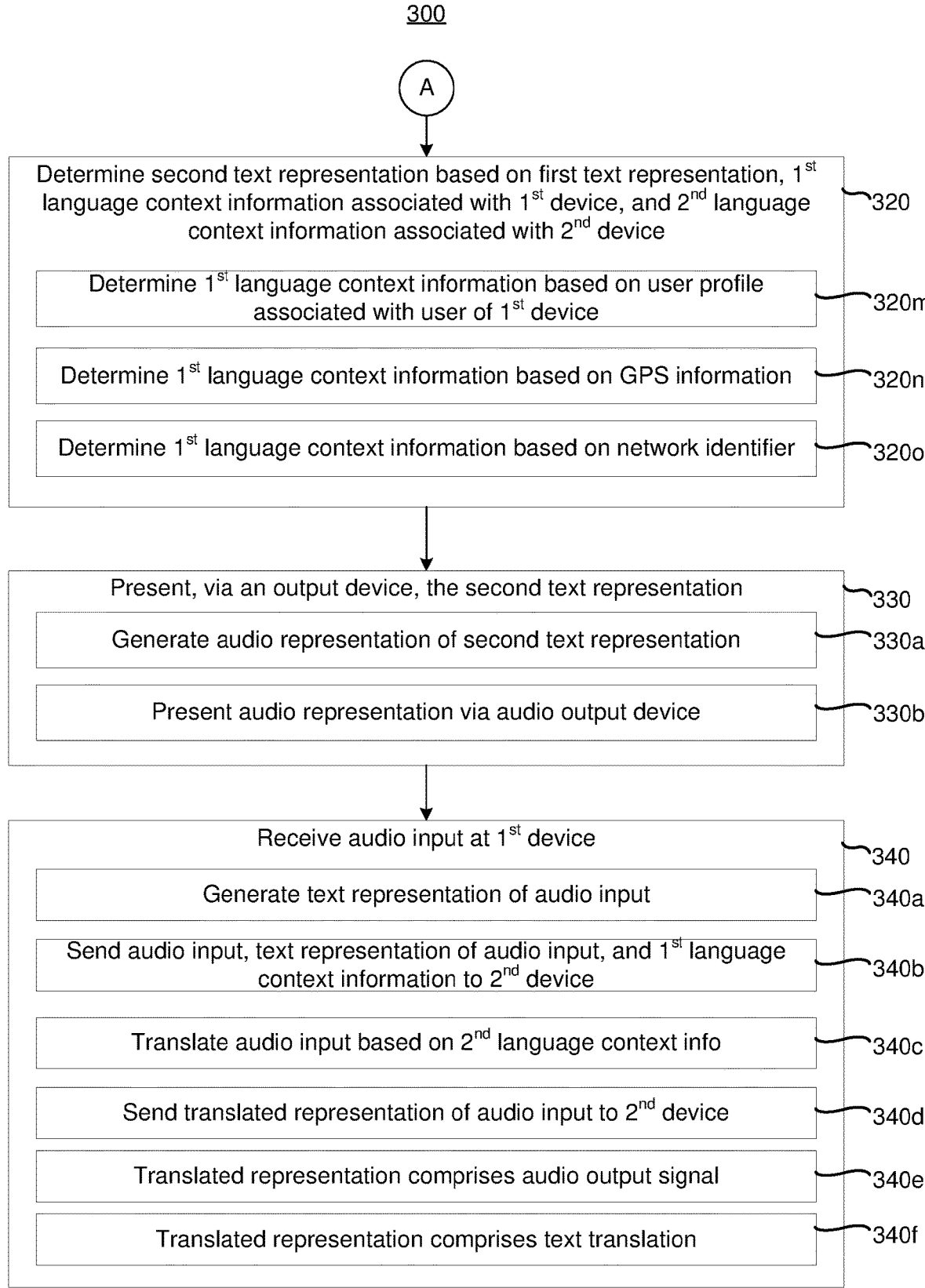

FIGS. 3A-3B are a flowchart representation of a method 300 for presenting text representations based on language context in accordance with various implementations. In various implementations, the method 300 is performed by a device (e.g., the first electronic device 100 shown in FIGS. 1A-1B, or the content presentation engine 200 shown in FIGS. 1A-1B and 2). In some implementations, the method 300 is performed by processing logic, including hardware, firmware, software, or a combination thereof. In some implementations, the method 300 is performed by a processor executing code stored in a non-transitory computer-readable medium (e.g., a memory). In various implementations, an XR environment corresponding to a field of view of an image sensor (e.g., a scene-facing camera) of the device is displayed.

Briefly, the method 300 includes receiving a first text representation of an audio signal corresponding to a spoken phrase detected at a second device and determining a second text representation based on the first text representation, first language context information associated with the first device, and second language context information associated with the second device. The second text representation is presented via an output device (e.g., displayed on a display or an audio version of the text representation is played by a speaker).

In various implementations, as represented by block 310, the method 300 includes receiving a first text representation of audible signal data corresponding to a spoken phrase detected at a second device (e.g., receiving the first text representation 120 shown in FIGS. 1A and 1B, and/or the first text representation 212 shown in FIG. 2). For example, a user of the second device may participate in a local (e.g., collocated in the same physical environment) or remote (e.g., located in different physical environments) communication session that includes audio and/or video components. The second device may include an audio sensor that detects the audible signal and converts the audible signal to audible signal data. In some implementations, the second device generates the first text representation based on the audible signal data, for example, using speech-to-text conversion. The first text representation may include closed captions that includes cues separate from the spoken phrase of the communication session, such as indicators of non-speech sounds and/or indicators of the identity of a speaker. In some implementations, the second device generates the first text representation in response to a user input that enables an audio visualization mode (e.g., a transcript mode or a closed caption mode).

In various implementations, as represented by block 320, the method 300 includes determining a second text representation based on the first text representation, first language context information associated with a first device, and second language context information associated with the second device (e.g., determining the second text representation 140 shown in FIG. 1B and/or the second text representation 222 shown in FIG. 2). As represented by block 320a, the second language context information may be received from the second device. The second language context information may indicate a language that is associated with the second device (e.g., a default language of the second device and/or a preferred language of a user of the second device). The second language context information may indicate a linguistic characteristic associated with the second device (e.g., a formality level, a literary style, a vocabulary and/or a verbosity level). The second language context information may correspond to a location that is associated with the second device and may be determined by the second device, for example, based on information available to the second device. For example, as represented by block 320b, the second language context information may be determined based on a device profile that is associated with the second device. As represented by block 320c, in some implementations, the second language context information is determined based on a user profile that is associated with a user of the second device. The device profile or the user profile may associate the second device or the user of the second device with a language and/or a geographic region, such as a country with a predominant language or a predominant speaking style. In some implementations, as represented by block 320d, the second language context information is determined based on GPS information, which may be mapped to a geographic region where a particular language is spoken or a particular vocabulary is used. In some implementations, as represented by block 320e, the second language context information is determined based on a network identifier, such as a cell identifier or an SSID, which may be associated with a geographic region where a particular language is spoken or particular phrases are commonly used.

In some implementations, as represented by block 320f, the second language context information is determined based on the audible signal data. For example, the first device or the second device may detect a spoken language associated with a spoken phrase based on the audible signal data. The second device may determine the second language context information based on the spoken language. In some implementations, as represented by block 320g, the second device determines the second language context information based on the first text representation. For example, the second device may analyze the first text representation to determine a language represented in the first text representation. The second device may determine the second language context information based on the language.

In some implementations, as represented by block 320h, the second language context information is obtained from a database. The database may store data associating electronic devices and/or users with respective languages, linguistic characteristics and/or geographic regions with known predominant languages or speaking styles (e.g., commonly used slangs).

In some implementations, as represented by block 320i, determining the second text representation includes determining whether the first language context information and the second language context information satisfy a similarity threshold. If not, a translation of the first text representation is generated. In some implementations, as represented by block 320j, a target language for the translation is determined based on a language indicated by the first language context information. As represented by block 320k, in some implementations, a source language for the translation is determined based on a language indicated by the second language context information.

In some implementations, the first language context information indicates a language that corresponds to a location that is associated with a device in which the content presentation engine 200 is implemented. The first language context information may be determined based on information available to the content presentation engine 200. For example, in some implementations, as represented by block

320l, the first language context information is determined based on a device profile that is associated with the device in which the content presentation engine 200 is implemented. The device profile may be associated with a geographic region, such as a country where a particular language is spoken or a particular vocabulary is used. In some implementations, as represented by block 320m on FIG. 3B, the first language context information is determined based on a user profile that is associated with a user. For example, the user profile may associate the user with a geographic region, such as a country where a particular language is spoken or a particular vocabulary is used. In some implementations, as represented by block 320n, the first language context information is determined based on GPS information, which may be mapped to a geographic region where a particular language is spoken or a particular vocabulary is used. As represented by block 3200, in some implementations, the first language context information may be determined based on a network identifier, such as a cell identifier or an SSID, which may be associated with a geographic region where a particular language is spoken or a particular vocabular is used.

In some implementations, the second text representation is in the same language as the first text representation but may have spelling or vocabulary differences as compared with the first text representation. For example, if the first language context information corresponds to the United States and the second language context information corresponds to the United Kingdom, the device may replace United Kingdom spellings and vocabulary in the first text representation with United States equivalents. As another example, if the first text representation corresponds to speech spoken by a resident of the United Kingdom and the second text representation is being displayed on a device that belongs to an American, the device can replace "tube" with "subway" so that the American can more easily understand the reference to an underground train.

In some implementations, the first language context information indicates a first language associated with the first device and second language context information indicates a second language associated with the second device. In such implementations, determining the second text representation includes translating the first text representation from the second language to the first language. For example, translating the first text representation from a source language to a target language (e.g., a preferred language of a user of the first device).

In some implementations, the first language context information indicates a first locale associated with the first device and the second language context information indicates a second locale associated with the second device. In such implementations, determining the second text representation includes modifying the first text representation based on linguistic differences between the first locale and the second locale. For example, modifying the first text representation to generate the second text representation such that the second text representation appears to be a transcript of speech that is spoken in the first locale of the first device.

In some implementations, the first language context information indicates a first vocabulary associated with the first device and the second language context information indicates a second vocabulary associated with the second device. In such implementations, determining the second text representation includes replacing a phrase in the first text representation with a replacement phrase from the first vocabulary. For example, replacing phrases in the first text representation to generate the second text representation such that the second text representation uses phrases from the first vocabulary that the user of the first device may be more familiar with.

In some implementations, the first language context information indicates a first verbosity associated with the first device and the second language context information indicates a second verbosity associated with the second device. In such implementations, determining the second text representation includes modifying the first text representation to match the first verbosity associated with the first device. For example, adjusting a length of the first text representation to generate the second text representation such that the second text representation has a length (e.g., a word count) that the user of the first device prefers.

In some implementations, determining the second text representation includes determining whether the first language context information and the second language context information satisfy a similarity threshold. In some implementations, on a condition that the first language context information and the second language context information satisfies the similarity threshold, using the first text representation as the second text representation.

As represented by block 330, in various implementations, the method 300 includes presenting the second text representation (e.g., displaying the second text representation on a display, and/or generating and playing an audio version of the second text representation via a speaker). For example, as shown in FIG. 1B, the first electronic device 100 displays the second text representation 140 on a display of the first electronic device 100. In some implementations, the method 300 includes displaying a partially completed version of the text representation. For example, the device can display a second text representation that corresponds to a portion of a sentence while the device is waiting to receive the first text representation for a remainder of the sentence. By contrast, in some implementations, the method 300 includes outputting an audio version of a completed text representation. For example, the device plays an audio version of a sentence or a phrase after receiving the first text representation for the entire sentence or the entire phrase.

As represented by block 330*a*, in some implementations, the method 300 includes generating an audio representation of the second text representation. As represented by block 330*b*, in some implementations, the method 300 includes presenting the audio representation of the second text representation via an audio output device. For example, the first electronic device 100 can perform a text-to-speech operation to generate an audible version of the second text representation 140 and output the audible version via a speaker of the device. In some implementations, the device may generate the audio representation in response to an indication that a user of the device is visually-impaired and may not be able to properly view the second text representation. In some implementations, the device generates and outputs the audio representation of the second text representation when the device is in an accessibility mode. In some implementations, the device generates the audio representation when the audible signal data is distorted (e.g., unintelligible).

In some implementations, as represented by block 340, an audio input is received at the first device. A text representation of the audio input may be generated, as represented by block 340*a*. For example, the first device may use speech-to-text conversion to generate the text representation. As represented by block 340*b*, in some implementations, the audio input, the text representation of the audio input, and the first language context information are sent to the second device. A second text representation of the audio input may be generated based on the second language context information, as represented by block 340*c*. In some implementations, as represented by block 340*d*, the second text representation is sent to the second device. As represented by block 340*e*, the second text representation may be accompanied by an audio output signal. For example, the second text representation may be accompanied by synthesized speech. In some implementations, as represented by block 340*f*, the second text representation includes a text translation of the first text representation.

In some implementations, the method 300 includes receiving, from the second device, device status data that indicates a resource availability of the second device. In such implementations, the first device can generate the text representation of the audio input in response to the resource availability of the second device being below a resource availability threshold associated with generating the text representation. Generating the text representation may require a threshold amount of computing power, a threshold amount of memory and/or a threshold amount of battery level. If the device status data indicates that the second device does not have the required amount of computing power, memory and/or battery level, the first device determines that the second device may not have the capability to generate the text representation of the audio input. As such, the first device generates the text representation and transmits the text representation in addition to or instead of transmitting audible signal data that corresponds to the audio input.

In some implementations, the method 300 includes reconstructing audible signal data based on the text representation. In some implementations, the device receives audible signal data that corresponds to a phrase spoken by a user of another device. The device also receives a text representation (e.g., a transcript) of the phrase spoken by the user of the other device. In some implementations, the audible signal data may be distorted beyond a distortion threshold (e.g., corrupted, for example, due to errors introduced during transmission). In such implementations, the device can restore (e.g., correct the errors) the audible signal data based on the text representation. Since the device has a transcript of what was spoken at the other device, the device can use the transcript to reconstruct the distorted audio and play a reconstructed version of the audible signal data. In some implementations, the device generates new audible signal data based on the transcript and outputs the new audible signal data via a speaker of the device. In some implementations, the new audible signal data is a reconstruction of the audible signal data that the device received. The device can display a notification indicating that the audio being played has been altered (e.g., reconstructed) based on the transcript.

In some implementations, the method 300 includes reconstructing image data based on the text representation. In some implementations, the device receives image data (e.g., a video feed with a sequence of image frames) that depicts movement of a person that is speaking phrases that correspond to the text representation. The device also receives a text representation (e.g., a transcript) of the phrases spoken by the person. In some implementations, the image data may be distorted beyond a distortion threshold (e.g., corrupted, for example, due to errors introduced during transmission and/or due to limited bandwidth availability). In such implementations, the device can restore the image data based on the text representation. Since the device has a transcript of what was spoken at the other device, the device can use the transcript to reconstruct (e.g., correct the errors) the distorted image data and display a reconstructed version of the image data. In some implementations, the device generates new image data based on the transcript and displays the new image data via the display of the device. In some implementations, the new image data is a reconstruction of the image data that the device received. As an example, if the device receives a video feed of a person talking and a transcript of what the person is saying, the device can use the transcript to reconstruct the video feed if the video feed freezes. For example, if the transcript indicates that the person is talking and the video feed shows no movement in the person's lips, the device can simulate movement of the lips based on the transcript in order to provide an appearance that the lips are moving to utter the phrases included in the transcript. The device can display a notification indicating that the video feed being displayed has been altered (e.g., reconstructed) based on the transcript.

In some implementations, bandwidth constraints may prevent the first device from receiving audible signal data that corresponds to the spoken phrase. However, the bandwidth constraints may not prevent the first device from receiving the text representation of the spoken phrase, for example, because receiving bits corresponding to text characters may require less bandwidth than receiving bits corresponding to the audible signal data. In such implementations, the first device can construct an audible version of the spoken phrase based on the text representation. In some implementations, the first device may have access to a prerecorded voice sample of a person that uttered the spoken phrase. In such implementations, the first device can determine acoustic characteristics (e.g., amplitude, frequency, speed, intonation, etc.) of the person's voice and construct the audible version of the spoken phrase using the acoustic characteristics of the person's voice in order to provide an appearance that the audible version of the spoken phrase originated from the person. The device can display a notification indicating that the audible version of the spoken phrase was reconstructed based on the text representation.

In some implementations, bandwidth constraints may prevent the first device from receiving image data that corresponds to the spoken phrase. However, the bandwidth constraints may not prevent the first device from receiving the text representation of the spoken phrase, for example, because receiving bits corresponding to text characters requires less bandwidth than receiving bits corresponding to the image data. In such implementations, the first device can construct a visual of the person uttering the spoken phrase based on the text representation. In some implementations, the first device may have access to an image of the person that uttered the spoken phrase. In such implementations, the first device can manipulate portions of the image (e.g., pixels corresponding to the person's lips) in order to provide an appearance that the first device has access to a video that depicts the person uttering the spoken phrase. The device can display a notification indicating that the video being displayed has been synthesized based on the text representation.

In some implementations, receiving the text representation (e.g., the transcript) reduces the need to generate the text representation at the device. Since transcribing audio can be a resource-intensive operation, not having to transcribe audio conserves computing resources. For example, not having to transcribe the audio extends a battery life of a battery-operated device. In some implementations, the device receives the text representation based on a resource availability level of the device. For example, if the device does not have sufficient computing power to generate the text representation, the device can receive the text representation instead of transcribing the audio. In some implementations, the first device requests the text representation when a resource availability level of the first device is less than a resource availability threshold. For example, the first device requests the text representation when a battery level of the device is less than a threshold battery level. In some implementations, a second device transmits the text representation to the device based on a known resource limitation of the device. For example, the second device may transmit the text representation to the device based on the first device being an HMD with limited computing power, limited memory and/or limited battery.

In some implementations, the first device transmits device status data to the second device. In such implementations, the second device can generate and transmit the text representation to the first device in response to the device status data indicating that the resource availability level of the first device is less than the resource availability threshold. In some implementations, the device status data may indicate the first device's ability to generate the text representation. For example, the device status data may indicate whether the first device has a capability to transcribe audio. If the device status data indicates that the first device does not have the capability to transcribe audio, the first device receives the text representation from the second device or from another device (e.g., a server or a cloud computing platform with more resources) that generates the text representation.

Figure 4:
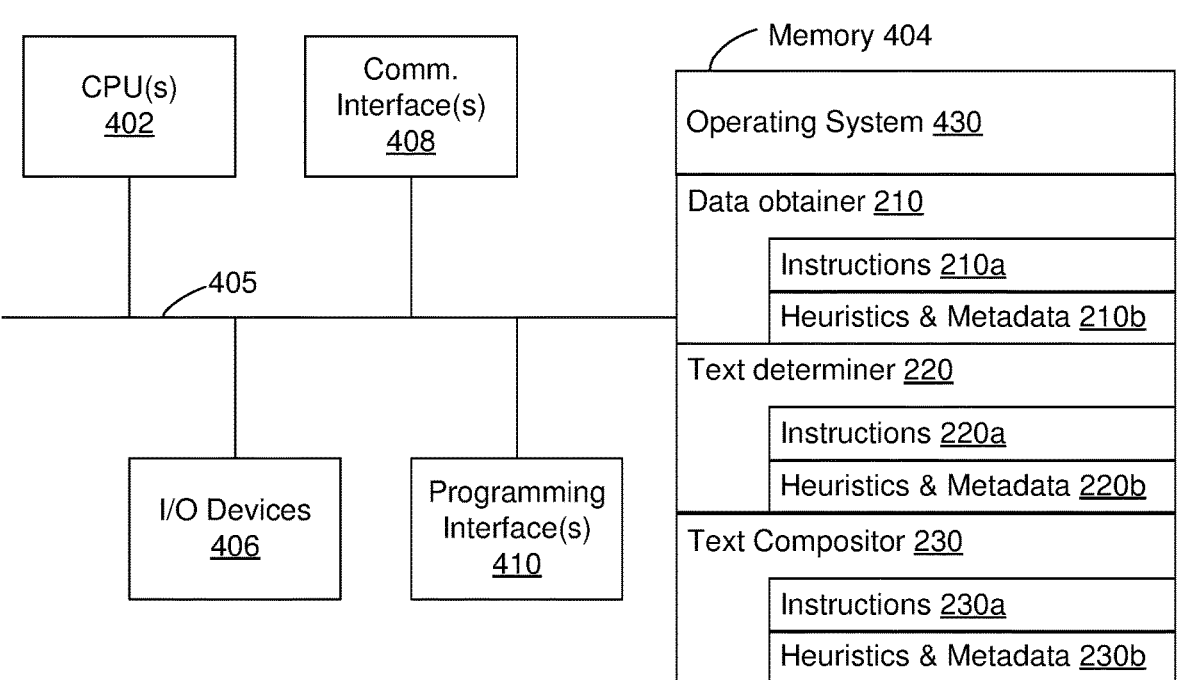
FIG. 4 is a block diagram of a device that presents a text representation of audible signal data in accordance with some implementations.

FIG. 4 is a block diagram of a device 400 in accordance with some implementations. In some implementations, the device 400 implements the first electronic device 100 shown in FIGS. 1A-1B, and/or the content presentation engine 200 shown in FIGS. 1A-1B and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 402, a memory 404, one or more input/output (I/O) devices 406, one or more communication interfaces 408, one or more programming interfaces 410, and one or more communication buses 405 for interconnecting these and various other components.

In some implementations, the communication interface 408 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 402. The memory 404 comprises a non-transitory computer readable storage medium.

In some implementations, the memory 404 or the non-transitory computer readable storage medium of the memory 404 stores the following programs, modules and data structures, or a subset thereof including an optional operating system 430, the data obtainer 210, the text determiner 220, and the text compositor 230. In various implementations, the device 400 performs the method 300 shown in FIGS. 3A-3B.

In some implementations, the data obtainer 210 includes instructions 210a and heuristics and metadata 210b for receiving a first text representation of audible signal data that corresponds to a spoken phrase detected at a second device.

In some implementations, the text determiner 220 determines a second text representation based on the first text representation, first language context information associated with the device with which the content presentation engine is associated, and second language context information that is associated with the second device. To that end, the text determiner 220 includes instructions 220a and heuristics and metadata 220b.

In some implementations, the text compositor 230 causes the second text representation to be displayed on a display by compositing the second text representation onto video data representing the video content of a communication session to generate video output data that is output to the display. To that end, the text compositor 230 includes instructions 230a and heuristics and metadata 230b.

In some implementations, the one or more I/O devices 406 include a user-facing image sensor (e.g., a front-facing camera) and/or a scene-facing image sensor (e.g., a rear-facing camera). In some implementations, the one or more I/O devices 406 include one or more head position sensors that sense the position and/or motion of the head of the user. In some implementations, the one or more I/O devices 406 include a display for displaying the graphical environment (e.g., for displaying the XR environment 106 shown in FIG. 1A). In some implementations, the one or more I/O devices 406 include a speaker for outputting an audible signal.

In various implementations, the one or more I/O devices 406 include a video pass-through display which displays at least a portion of a physical environment surrounding the device 400 as an image captured by a scene camera. In various implementations, the one or more I/O devices 406 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a first device comprising an output device, one or more processors, and a memory:

transmitting device status data to a second device, wherein the device status data indicates a resource availability of the first device;

receiving from the second device a first text representation of audible signal data corresponding to a spoken phrase detected at the second device in response to the resource availability of the first device being less than a resource availability threshold;

determining a second text representation based on the first text representation, first language context information associated with the first device, and second language context information associated with the second device; and presenting the second text representation via the output device.

2. The method of claim 1, wherein determining the second text representation comprises:

determining whether the first language context information and the second language context information satisfy a similarity threshold; and on a condition that the first language context information and the second language context information do not satisfy the similarity threshold, generating the second text representation by modifying the first text representation based on a difference between the first language context information and the second language context information.

3. The method of claim 1, wherein the first language context information indicates a first language associated with the first device and the second language context information indicates a second language associated with the second device; and wherein determining the second text representation comprises translating the first text representation from the second language to the first language.

4. The method of claim 1, wherein the first language context information indicates a first locale associated with the first device and the second language context information indicates a second locale associated with the second device; and wherein determining the second text representation comprises modifying the first text representation based on linguistic differences between the first locale and the second locale.

5. The method of claim 1, wherein the first language context information indicates a first vocabulary associated with the first device and the second language context information indicates a second vocabulary associated with the second device; and wherein determining the second text representation comprises replacing a phrase in the first text representation with a replacement phrase from the first vocabulary.

6. The method of claim 1, wherein the first language context information indicates a first verbosity associated with the first device and the second language context information indicates a second verbosity associated with the second device; and wherein determining the second text representation comprises modifying the first text representation to match the first verbosity associated with the first device.

7. The method of claim 1, wherein determining the second text representation comprises:

determining whether the first language context information and the second language context information satisfy a similarity threshold; and on a condition that the first language context information and the second language context information satisfy the similarity threshold, using the first text representation as the second text representation.

8. The method of claim 1, wherein presenting the second text representation comprises:

determining whether or not the second text representation includes a complete phrase or a complete sentence; and outputting the second text representation in response to determining that the second text representation includes a complete phrase or a complete sentence.

9. A first device comprising:

one or more processors;

a non-transitory memory;

an output device;

an input device; and one or more programs stored in the non-transitory memory, which, when executed by the one or more processors, cause the device to:

transmit device status data to a second device, wherein the device status data indicates a resource availability of the first device;

receive from the second device a first text representation of audible signal data corresponding to a spoken phrase detected at the second device in response to the resource availability of the first device being less than a resource availability threshold;

determine a second text representation based on the first text representation, first language context information associated with the first device, and second language context information associated with the second device; and present the second text representation via the output device.

10. A non-transitory memory storing one or more programs, which, when executed by one or more processors of a first device including an input device and an output device, cause the first device to:

transmit device status data to a second device, wherein the device status data indicates a resource availability of the first device;

receive from the second device a first text representation of audible signal data corresponding to a spoken phrase detected at the second device in response to the resource availability of the first device being less than a resource availability threshold;

determine a second text representation based on the first text representation, first language context information associated with the first device, and second language context information associated with the second device; and present the second text representation via the output device.

11. The method of claim 1, further comprising:

constructing one or more of audio and video of a user uttering the spoken phrase based on the first text representation.

12. The non-transitory memory of claim 10, wherein the one or more programs, which, when executed by the one or more processors of the first device, further cause the first device to determine the first language context information based on a profile associated with the first device.

13. The non-transitory memory of claim 10, wherein the one or more programs, which, when executed by the one or more processors of the first device, further cause the first device to receive the second language context information from the second device.

14. The non-transitory memory of claim 10, wherein the one or more programs, which, when executed by the one or more processors of the first device, further cause the first device to determine the second language context information based on a profile associated with the second device.

15. The non-transitory memory of claim 10, wherein the one or more programs, which, when executed by the one or more processors of the first device, further cause the first device to determine the second language context information based on the first text representation.

16. The non-transitory memory of claim 10, wherein the output device includes one or more speakers, and wherein presenting the second text representation comprises:

generating an audio representation of the second text representation; and presenting the audio representation via the one or more speakers.

17. The non-transitory memory of claim 10, wherein receiving the first text representation of audible signal data comprises:

receiving an audio input at the first device; and generating the first text representation based on the audio input.

18. The non-transitory memory of claim 17, wherein the one or more programs, which, when executed by the one or more processors of the first device, further cause the first device to:

receive, from the second device, device status data that indicates a resource availability of the second device; and generate the first text representation based on the audio input in response to the resource availability of the second device being below a resource availability threshold associated with generating the first text representation.

19. The non-transitory memory of claim 10, wherein the output device comprises one or more speakers, and wherein the one or more programs, which, when executed by the one or more processors of the first device, further cause the first device to:

obtain the audible signal data that is associated with the first text representation;

determine that the audible signal data is distorted beyond a distortion threshold;

generate new audible signal data based on the first text representation; and output the new audible signal data via the one or more speakers.

20. The first device of claim 9, wherein receiving the first text representation of audible signal data comprises:

receiving an audio input at the first device; and generating the first text representation based on the audio input.

21. The first device of claim 20, wherein the one or more programs, which, when executed by the one or more processors of the first device, further cause the first device to:

receive, from the second device, device status data that indicates a resource availability of the second device; and generate the first text representation based on the audio input in response to the resource availability of the second device being below a resource availability threshold associated with generating the first text representation.

22. The first device of claim 9, wherein the output device comprises one or more speakers, and wherein the one or more programs, which, when executed by the one or more processors of the first device, further cause the first device to:

obtain the audible signal data that is associated with the first text representation;

determine that the audible signal data is distorted beyond a distortion threshold;

generate new audible signal data based on the first text representation; and output the new audible signal data via the one or more speakers.

23. The first device of claim 9, wherein the output device comprises one or more displays, and wherein the one or more programs, which, when executed by the one or more processors of the first device, further cause the first device to:

obtain image data that is associated with the first text representation;

determine that the image data is distorted beyond a distortion threshold;

generate new image data based on the first text representation; and display the new image data on the one or more displays.

24. The first device of claim 9, wherein the one or more programs, which, when executed by the one or more processors of the first device, further cause the first device to:

construct one or more of audio and video of a user uttering the spoken phrase based on the first text representation.

\* \* \* \* \*